United States Patent
Cross et al.

[11] 3,758,233
[45] Sept. 11, 1973

[54] VIBRATION DAMPING COATINGS

[75] Inventors: Kenneth R. Cross, Indianapolis; John R. Cavanagh, Brownsburg; Richard L. Newman, Indianapolis, all of Ind.

[73] Assignee: General Motors Corporation, Detroit, Mich.

[22] Filed: Jan. 17, 1972

[21] Appl. No.: 218,219

[52] U.S. Cl.................. 416/229, 416/241, 416/500
[51] Int. Cl.............................................. F01d 5/10
[58] Field of Search..................... 416/241, 500, 229

[56] References Cited
UNITED STATES PATENTS

| | | | |
|---|---|---|---|
| 2,711,973 | 6/1955 | Wainer et al. | 416/241 X |
| 2,993,678 | 7/1961 | Schultz et al. | 416/241 X |
| 3,019,516 | 2/1962 | Holzwarth et al. | 29/198 |
| 3,129,069 | 4/1964 | Hanink et al. | 29/183.5 |
| 3,215,512 | 11/1965 | Coad | 29/191 |
| 3,301,530 | 1/1967 | Lull | 416/241 |
| 3,694,255 | 9/1972 | Brill-Edwards | 416/241 X |

*Primary Examiner*—Everette A. Powell, Jr.
*Attorney*—Sidney Carter and Peter P. Kozak

[57] ABSTRACT

Nickel, cobalt, aluminum, iron-nickel, molybdenum, and titanium alloy articles are provided with a plasma sprayed coating for increasing the vibration damping capacity thereof. The coating consists of a outermost layer portion formed of an oxide ceramic or refractory carbide and an intermediate portion formed of a mixture of one of the above alloys and the material forming the outermost layer. In the preferred embodiment, the intermediate portion consists of two or more discrete layers, with the layers having decreasing alloy content and increasing oxide ceramic content toward the outermost layer portion.

5 Claims, 4 Drawing Figures

VIBRATION DAMPING COATINGS

The invention herein described was made in the course of work under a contract or subcontract thereunder with the United States Air Force.

This invention relates to bladed elements such as axial compressor blades, impellers, and rotor blades of gas turbine engines, compressors and the like and, more particularly, to coatings for increasing the vibration damping capacity of such bladed elements.

In gas turbine engines, compressors and the like, the root section of the bladed elements is fixed in a rotor to form a body having a plurality of circumferentially spaced radially extending blades. During operation, the blades are subjected to relatively high stresses resulting from the high rotational speed of the rotors and the gas flow between the blades, which cause vibration of the blades. A blade may vibrate in many ways. Since the root section of the blade is fixed in the rotor, the blade vibrates as a simple contilever. However, higher frequency vibrations arise from the torsional modes, bending and combined cantilever oscillation and torsion, together with harmonics of all types. When the rotational speed of the rotor is an even multiple of the natural frequencies of vibration of a portion of the rotor, resonance will occur, high vibrational stresses will arise, and fatigue failure of the blades will eventually occur.

When materials must function near upper stress and fatigue limits, the vibration damping capacities thereof become of prime importance. Vibration damping can be achieved by altering structural configurations to redistribute the mass and stiffness of the blade or by utilizing materials having high intrinsic damping capacities. However, present designs have been optimized for performance and presently available materials are being utilized to their ultimate limits.

Accordingly, it is the principal object of this invention to provide an article having improved vibration damping capacity.

It is another object of this invention to provide improved vibration damping means for bladed elements for dissipating the energy of vibration.

It is a further object of this invention to provide graded layered coatings for metallic bladed elements useful specifically for increasing the vibration damping capacity of the elements.

It is still further an object of this invention to provide a vibration damping sprayed coating for metallic bladed elements including a discrete, outer exposed layer portion formed of an oxide ceramic or refractory carbide and an intermediate portion formed of a mixture of metal and the material forming the outer exposed layer portion for improving the damping efficiency of the elements.

In the preferred embodiments of the invention, these and other objects are accomplished by providing a bladed element with a plasma sprayed coating consisting of a discrete outermost layer portion consisting essentially of an oxide ceramic or refractory carbide, a metal substrate adjacent the surface of the element, and an intermediate portion between the outermost layer portion and the substrate consisting essentially of a mixture of the material forming the outermost layer portion and the metal forming the substrate. In one embodiment, the intermediate portion consists of two discrete layers with the layer adjacent the outermost layer portion having a higher percentage of oxide ceramic or refractory carbide than the layer thereunder and the layer adjacent the substrate having a higher percentage of substrate metal than the layer thereover. It may thus be seen that the percentage of oxide ceramic or refractory carbide in the coating increases from zero at the substrate level to 100 percent at the outermost layer portion and vice versa with respect to the percentage of substrate metal in each layer. Accordingly, the coating may be described as being "graded."

Other objects and advantages of the invention will become apparent from the following detailed description reference being had to the accompanying drawings of which:

Figure 1:
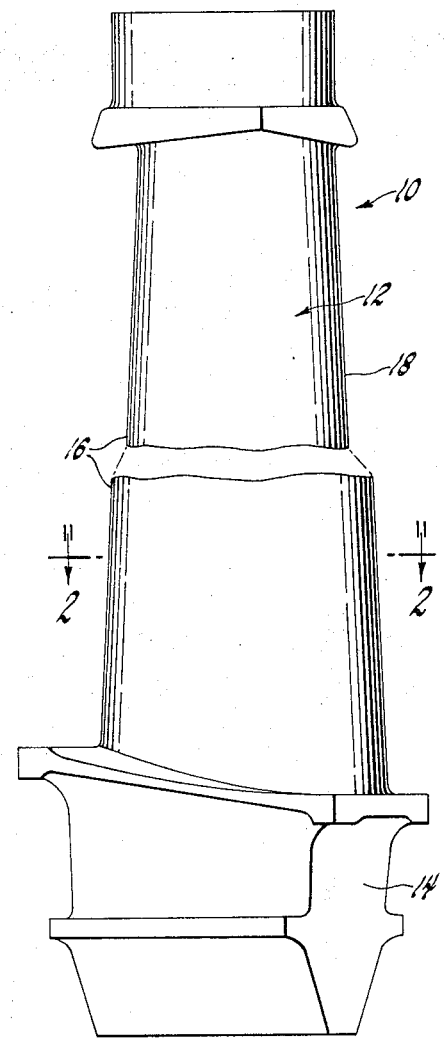
FIG. 1 is an elevational view of a bladed element in accordance with this invention.
Figure 2:
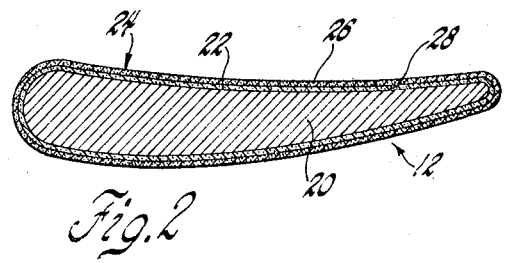
FIG. 2 is a section taken along line 2—2 of FIG. 1.

Referring now to FIG. 1, there is shown the general construction of a bladed element 10 in accordance with this invention, e.g., a rotor blade for use in a gas turbine engine, comprising an airfoil section 12 and a root section 14. The airfoil section 12 includes a leading edge 16 and a trailing edge 18. Referring to FIG. 2, it may be seen that the airfoil section 12 comprises a core 20, a substrate portion 22, and a coextensive sprayed coating 24 including an outer, exposed layer portion 26 and an intermediate portion 28. The core 20 and the substrate portion 22 thereof may be formed of any suitable metal such as nickel, cobalt, aluminum, iron-nickel, molybdenum, and titanium based alloys.

The following specific examples will serve to illustrate this invention and its advantages.

EXAMPLE I

Three aluminim test blades formed of AMS 4158 aluminum were provided. AMS 4158 aluminum has the following composition, by weight: 6.3 to 7.3 percent zinc, 2.4 to 3.1 percent magnesium, 1.6 to 2.4 percent copper, 0.18 to 0.40 percent chromium, and a maximum of 0.50 percent silicon, 0.7 percent iron, 0.3 percent manganese, and 0.2 percent titanium, and balance aluminum. One of the blades was used as a comparative standard, and the other two blades were grit blasted to prepare their surfaces for coating.

Figure 3:
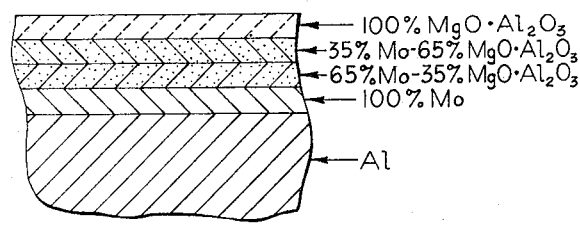
FIG. 3 is a schematic cross-sectional representation of the coating in accordance with one embodiment of this invention.

One blade was plasma spray coated with a 0.010 inch thick coating of magnesium aluminate ($MgO.Al_2O_3$). The other blade was plasma spray coated with a first or substrate coating of molybdenum, 0.003 inch thick, then a 0.002 inch thick coating consisting, by weight, of 65 percent molybdenum and 35 percent $MgO.Al_2O_3$, then a 0.002 inch thick coating of 35 percent molybdenum and 65 percent $MgO.Al_2O_3$, and finally a 0.003 inch thick coating of 100 percent $MgO.Al_2O_3$, as shown in FIG. 3.

In each case the coatings were applied by plasma spraying powders by well-known plasma spray coating techniques using a current of 420–450 amps at 30 volts, an argon-helium arc gas, and an argon cover gas. The distance from the workpiece to the blade surface was approximately three inches.

To evaluate the damping effect of the coatings, the blades were mounted as a cantilever, and the stress was monitored by a strain gage one-fourth inch above the root mounting on the concave side of the trailing edge. Excitation of the blades was provided by an air siren equipped with a solenoid operated plunger to close the siren discharge and chop the excitation. The strain gage output was displayed on an oscilloscope and the stress versus cycle number and percent logarithmic decrement of damping was calculated from the die-away traces. Percent logarithmic decrement of damping is the common mode for expressing damping capacity; the higher the value, the higher the damping capacity.

The results of the evaluation are presented in Table I.

TABLE I

| Vibration mode | Cycle No. | Uncoated blade | | 0.010 inch MgO·Al₂O₃ coating | | 4-layer graded coating of Mo and MgO·Al₂O₃ | |
|---|---|---|---|---|---|---|---|
| | | Stress (± p.s.i.) | Percent log-dec | Stress (± p.s.i.) | Percent log-dec | Stress (± p.s.i.) | Percent log-dec |
| Fundamental | 1 | 8,908 | .656 | 7,185 | 6.18 | 6,193 | 7.78 |
| | 15 | 8,118 | .669 | 3,255 | 5.13 | 2,285 | 6.46 |
| | 30 | 7,335 | .683 | 1,640 | 4.00 | 965 | 5.03 |
| | 45 | 6,614 | .696 | 979 | 2.87 | 504 | 3.61 |
| | 60 | 5,952 | .709 | 692 | 1.75 | 326 | 2.19 |
| 2nd bend | 1 | 3,882 | .169 | 4,158 | 1.008 | 3,920 | 3.31 |
| | 15 | 3,787 | .186 | 3,461 | 1.608 | 2,439 | 3.47 |
| | 30 | 3,678 | .204 | 2,592 | 2.25 | 1,430 | 3.65 |
| | 45 | 3,562 | .221 | 1,762 | 2.89 | 817 | 3.82 |
| | 56 | 3,482 | .233 | 1,291 | 3.32 | 554 | 3.94 |
| 1st torsion | 1 | 1,877 | .306 | 2,377 | 1.09 | 2,232 | 1.76 |
| | 20 | 1,783 | .231 | 1,882 | 1.37 | 1,578 | 1.88 |
| | 40 | 1,717 | .151 | 1,390 | 1.66 | 1,069 | 2.01 |
| | 60 | 1,679 | .072 | 969 | 1.95 | 705 | 2.14 |
| | 80 | 1,668 | .000 | 651 | 2.23 | 464 | 2.26 |
| 3rd bend | 1 | 2,257 | .032 | 2,692 | −.485 | 1,085 | −.41 |
| | 15 | 2,232 | .129 | 2,745 | .204 | 1,019 | 1.31 |
| | 30 | 2,172 | .233 | 2,520 | .942 | 730 | 3.15 |
| | 45 | 2,081 | .337 | 2,070 | 1.68 | 396 | 4.99 |
| | 55 | 2,005 | .406 | 1,707 | 2.17 | 226 | 6.22 |

Referring to Table I and particularly to the first cycle of the fundamental mode of vibration, it may be seen that for the uncoated blade the percent logarithmic decrement of damping was only 0.656 and that by coating the blade with a single layer of MgO.Al₂O₃, a substantially higher percent logarithmic decrement of damping was obtained, i.e., 6.18. However, it may be further seen that by providing the blade with a graded layered coating even higher damping decrements were obtained, i.e., 7.78 for the graded layered coating as compared to 6.18 for the single layer coating. Further, it may be seen that this trend was exhibited in all vibrational modes at virtually every cycle, and that as a result the blade with the four layers graded coating was subjected to substantially less stress during cycling.

EXAMPLE II

Four test beams formed of Hastelloy X were provided. Hastelloy X is a nickel-based superalloy having the following nominal composition: 0.10 percent carbon, 0.5 percent manganese, 0.5 percent silicon, 22 percent chromium, 1.5 percent cobalt, 9 percent molybdenum, 0.6 percent tungsten, 18.5 percent iron, and the balance nickel.

Figure 4:
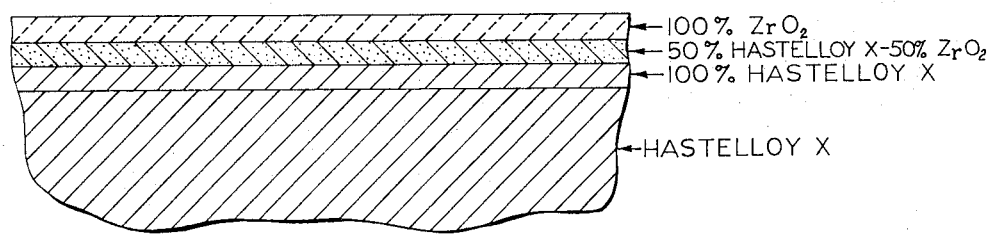
FIG. 4 is a schematic cross-sectional representation of the coating in accordance with another embodiment of this invention.

Of the four test beams, one was left uncoated, one was plasma spray coated with a 0.011 inch thick layer of Hastelloy X, one was plasma spray coated with a substrate layer of 100 percent Hastelloy X, 0.0035 inch thick, an intermediate layer of 50 percent Hastelloy X –50 percent zirconium dioxide (ZrO₂), 0.0045 inch thick, and an outer layer of 100 percent ZrO₂, 0.003 inch thick (shown in FIG. 4). The remaining blade was coated with a substrate layer of 100 percent Hastelloy X, 0.003 inch thick, a first intermediate layer of 65 percent Hastelloy X– 35 percent MgO.Al₂O₃, 0.002 inch thick, a second intermediate layer of 35 percent Hastelloy X– 65 percent MgO.Al₂O₃, 0.0025 inch thick, and an outer, exposed layer of 100 percent MgO.Al₂O₃, 0.0035 inch thick in the same manner as described in Example I and shown in FIG. 3, except that Hastelloy X was substituted for molybdenum. Vibration analysis of all four blades at a stress of 10,000 psi yielded the following results in terms of percent logarithmic decrement of damping.

Uncoated beam 0.4
0.011 Coating of Hastelloy X 1.15 2

3 Layer Coating graded from Hastelloy X to ZrO₂ 18 1.47

4 Layer coating graded from Hastelloy X to MgO.Al₂O₃ 1.8

From the foregoing, it may be seen that substantially improved damping capacity is observed in those beams having graded layered coatings in accordance with this invention. It is well to note, however, that although the foregoing examples demonstrate that this invention substantially increases the damping capacity of structures subject to vibration, the absolute values of damping capacity are not directly comparable between Examples I and II due to structural effects.

Thus having described the invention, a few general comments may be made concerning various features thereof. In applying the coatings as described above, it has been found desirable that the blade be first plasma sprayed with a metal to enhance bonding of the subsequent layers to the blade. In this case, the initial metal layer forms the substrate upon which the coating is applied. For example, Example I describes and FIG. 3 shows an aluminum alloy blade having a plasma sprayed molybdenum substrate layer on the order of 0.003 inch in thickness. The coating is then graded with a mixture of molybdenum and MgO.Al₂O₃. Further, FIG. 4 shows and Example II describes a Hastelloy X beam having a plasma sprayed substrate layer of Hastelloy X on the order of 0.003 – 0.0035 inch in thickness. The particular metal used to provide the substrate is not critical; however, as a general requirement, the metal should have a similar thermal expansion coefficient as the metal forming the core of the blade and should not form brittle intermetallics therewith. An initial sprayed metal layer is not critical to the practice of this invention, however, and the advantages thereof can be realized by grading the coating directly from the blade, in which case the blade itself forms the substrate and the intermediate portion of the coating thus consists of a mixture of the metal forming the blade and the material forming the outermost layer portion.

Although this invention has been described in detail with reference to the use of magnesium aluminate and zirconium dioxide as the materials forming the outermost layer portion, other oxide ceramics, e.g., alumina ($Al_2O_3$), titanium dioxide ($TiO_2$), silicon dioxide ($SiO_2$), and chromium oxide ($Cr_2O_3$), and refractory carbides, e.g., carbides of tungsten, chromium, and titanium are also useful in this invention.

Further, it is not necessary that the entire airfoil surface be coated in accordance with this invention. That is, under some circumstances it is conceivable that certain areas of the blade will be subject to unusually high stresses, in which case the coatings would be most effective at the areas of maximum stress.

Thus it can be seen that this invention provides bladed elements which have substantially improved damping capacities over that intrinsic in the material itself.

Although we have described our invention in connection with rotor blades it is equally applicable to stator blades, gears, discs, rings, or any metallic article subject to vibration. Furthermore, although our invention has been described in terms of certain specific embodiments, it will be apparent to those skilled in the art that various modifications may be made within the scope of the invention.

We claim:

1. An article of manufacture comprising a substrate formed of a metal taken from the group consisting of nickel, cobalt, aluminum, iron-nickel, molybdenum, and titanium based alloys; and a sprayed coating thereover, said coating consisting of a discrete outermost layer portion consisting essentially of a material taken from the group consisting of magnesium aluminate and zirconium dioxide, and an intermediate portion between said outermost layer portion and said substrate consisting essentially of a mixture of the metal forming said substrate and the material composing said outermost layer portion.

2. An article of manufacture comprising a substrate formed of a metal taken from the group consisting of nickel, cobalt, aluminum, iron-nickel, molybdenum, and titanium based alloys; and a sprayed coating thereover, said coating consisting of a discrete outermost layer portion consisting essentially of an oxide ceramic material taken from the group consisting of magnesium aluminate and zirconium dioxide, and an intermediate portion between said outermost portion and said substrate consisting of a plurality of discrete intermediate layers, each of said intermediate layers consisting essentially of a mixture of about 65 to 35 percent of the metal forming said substrate and the balance being of the material composing said outermost layer portion, the proportion of said oxide ceramic material in each of said intermediate layers increasing from said substrate to said outermost layer portion.

3. An article of manufacture comprising a core formed of aluminum, a sprayed substrate bonded to said core formed of molybdenum, and a sprayed coating over said substrate, said coating consisting of a discrete outermost layer portion consisting essentially of magnesium aluminate, and an intermediate portion between said outermost layer portion and said substrate consisting of a first discrete intermediate layer immediately beneath said outermost layer consisting essentially of about 65 percent magnesium aluminate and 35 percent molybdenum, and a second discrete intermediate layer between said first intermediate layer and said substrate consisting essentially of about 35 percent magnesium aluminate and 65 percent molybdenum, said substrate, outermost layer, and first and second intermediate layers being at least about 0.002 inch in thickness.

4. Claim 3 wherein said article is a compressor blade for use in a gas turbine engine.

5. An article of manufacture comprising a core formed of a nickel based superalloy, a sprayed nickel base superalloy substrate bonded to said core, and a spray coating over said substrate, said coating consisting of a discrete outer layer portion consisting essentially of zirconium dioxide, and an intermediate layer portion between said outermost layer portion and said substrate consisting essentially of about equal portions of a nickel base superalloy and zirconium dioxide, said substrate, outermost layer and intermediate layer each being at least about 0.002 inch in thickness.

* * * * *

PO-1050
(5/69)

UNITED STATES PATENT OFFICE
CERTIFICATE OF CORRECTION

Patent No. 3,758,233　　　　Dated September 11, 1973

Inventor(s) Kenneth R. Cross, John R. Cavanagh, Richard L. Newman

It is certified that error appears in the above-identified patent and that said Letters Patent are hereby corrected as shown below:

In the ABSTRACT, line 4, before "outermost" change "a" to -- an --.

Column 1, line 19, "contilever" should read -- cantilever --.

Column 4, line 13, after "1.15" delete the "2"; line 36, before "1.47" delete the "18".

Column 5, line 31, "ments," should read -- iments, --.

Signed and sealed this 1st day of January 1974.

(SEAL)
Attest:

EDWARD M. FLETCHER, JR.　　　　RENE D. TEGTMEYER
Attesting Officer　　　　　　　　Acting Commissioner of Patents